United States Patent [19]

Frank et al.

[11] 4,272,274
[45] * Jun. 9, 1981

[54] SLOTTED GLASS SHEET SHAPING MOLD

[75] Inventors: Robert G. Frank, Murrysville; Rudy Canonaco, Cheswick; Richard V. Posney, Freeport, all of Pa.

[73] Assignee: PPG Industries, Inc., Pittsburgh, Pa.

[*] Notice: The portion of the term of this patent subsequent to Apr. 8, 1997, has been disclaimed.

[21] Appl. No.: 78,627

[22] Filed: Sep. 25, 1979

Related U.S. Application Data

[63] Continuation-in-part of Ser. No. 954,696, Oct. 25, 1978, Pat. No. 4,197,108.

[51] Int. Cl.³ .............................................. C03B 23/03
[52] U.S. Cl. ...................................... 65/273; 65/285; 65/287
[58] Field of Search ............... 65/106, 107, 273, 268, 65/285, 287

[56] References Cited

U.S. PATENT DOCUMENTS

| 3,374,077 | 3/1968 | Cypher | 65/106 X |
| 3,374,080 | 3/1968 | Wheeler | 65/273 |
| 3,418,098 | 12/1968 | Kirkman | 65/106 X |
| 3,527,589 | 9/1970 | Ritter | 65/273 X |
| 3,756,797 | 9/1973 | Akeyoshi et al. | 65/107 X |
| 4,197,108 | 4/1980 | Frank et al. | 65/273 |

Primary Examiner—Arthur D. Kellogg
Attorney, Agent, or Firm—Donald Carl Lepiane; Edward I. Mates

[57] ABSTRACT

This invention relates to shaping glass sheets and particularly to a mold capable of shaping glass sheets having many different outline shapes but bent to the same radius of curvature. Such molds have dimensions larger than those of a family of windows of a given radius of curvature but different outline shapes. Such molds comprise a solid block of refractory material comprising a plurality of smooth, curved, upwardly facing, elongated shaping members extending continuously across an entire dimension of said mold and separated by transversely extending grooves that extend completely across the entire dimension of the shaping mold and have sufficient width and depth to permit clearance for raising the mold above a horizontal path of glass sheet travel defined by glass conveying elements.

6 Claims, 8 Drawing Figures

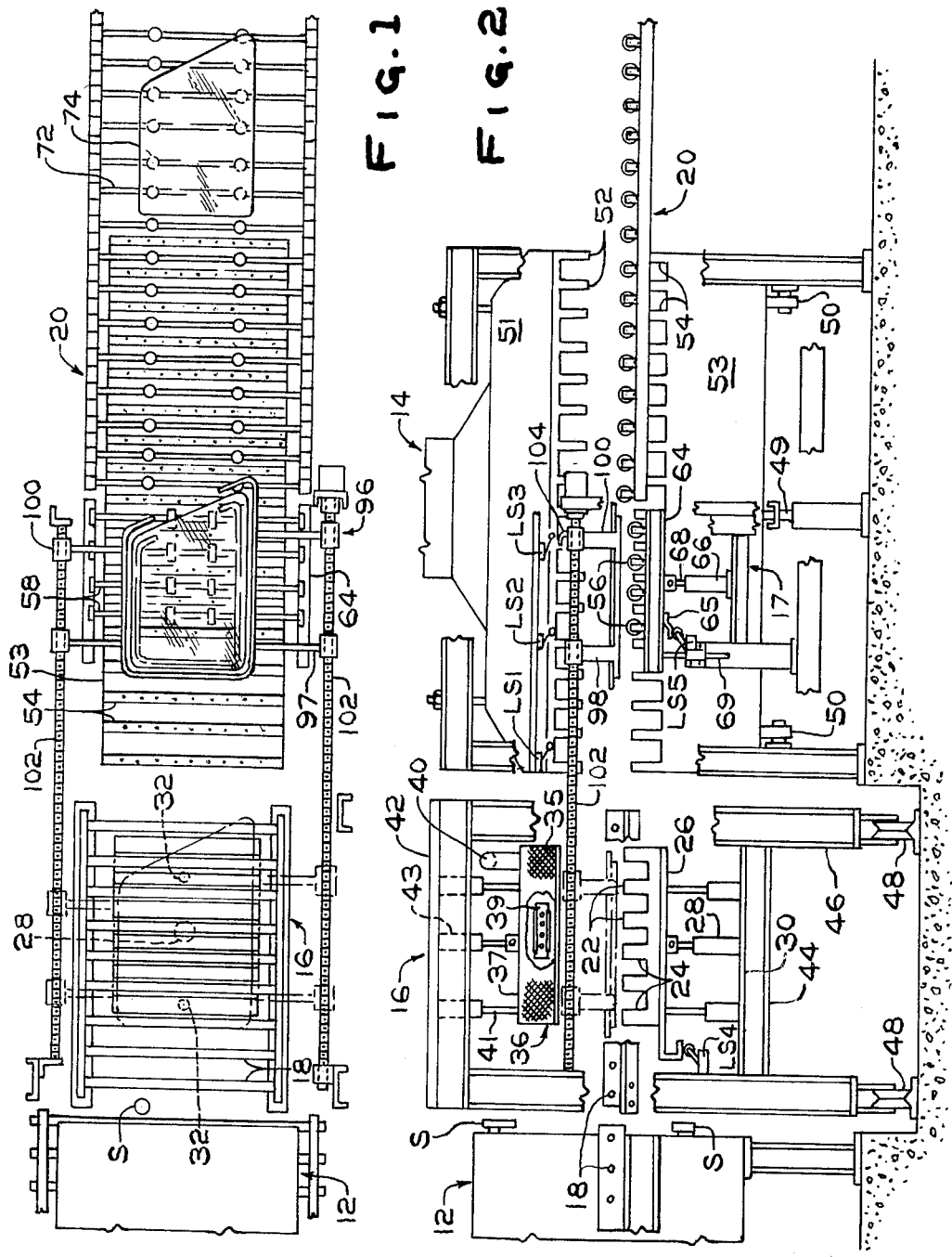

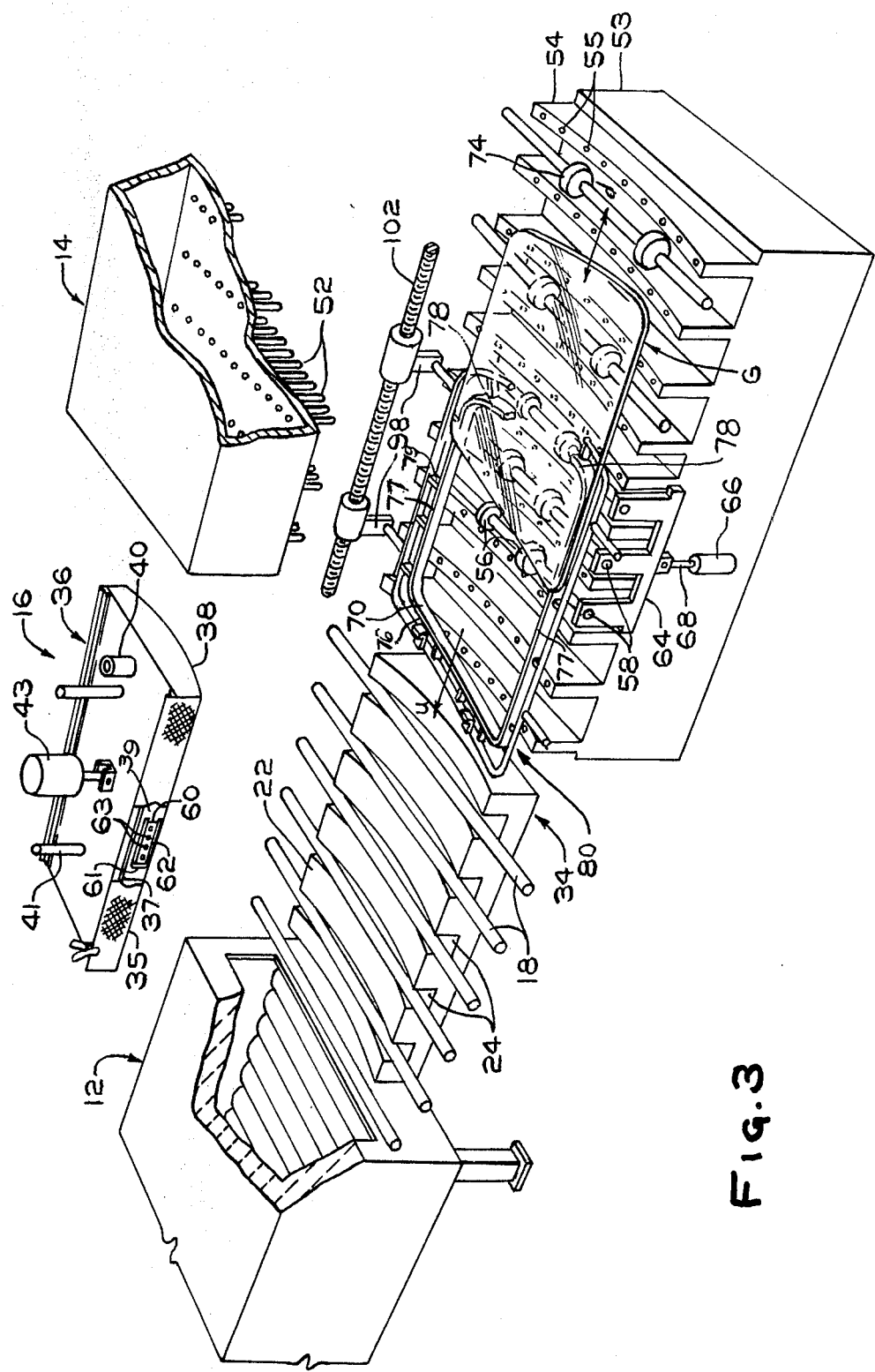

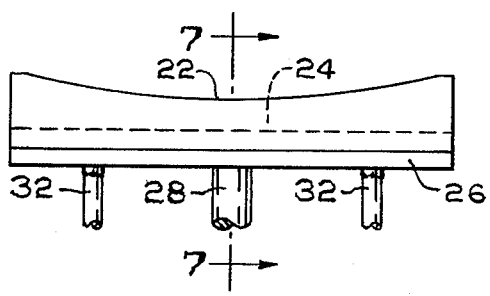
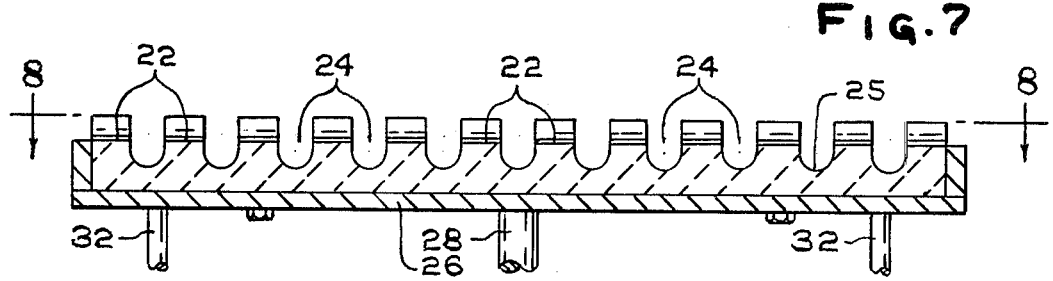
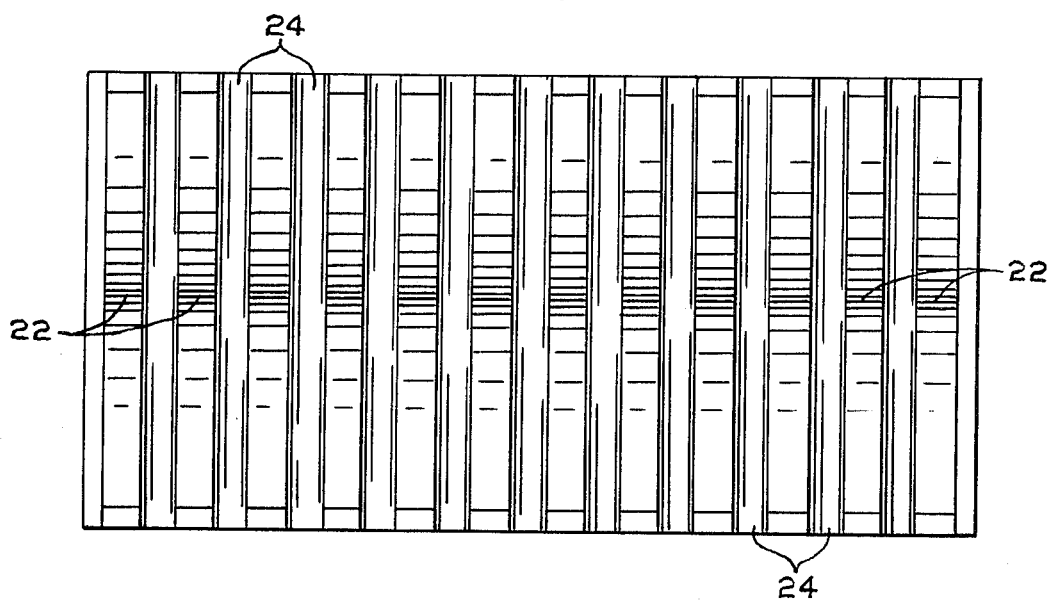

SLOTTED GLASS SHEET SHAPING MOLD

RELATION TO OTHER APPLICATIONS

This application is a continuation-in-part of application Ser. No. 954,696 of Robert G. Frank, Rudy Canonaco and Richard V. Posney, filed Oct. 25, 1978 now U.S. Pat. No. 4,197,108 for SLOTTED GLASS SHEET SHAPING MOLD.

BACKGROUND OF INVENTION

1. Field of the Invention

This invention relates to the shaping and cooling of glass sheets and particularly in the high speed production of bent glass sheets that are toughened by air quenching, and most particularly, for shaping and heat treating relatively thin glass sheets.

Shaped glass sheets are widely used as side windows in vehicles such as automobiles or the like and, to be suitable for such application, flat glass sheets must be shaped to precisely defined curvatures dictated by the shape and outline of the frames defining the window openings into which the glass side windows are installed. It is also important that the side windows meet stringent optical requirements and that the windows be free of optical defects that would tend to interfere with the clear viewing therethrough in their viewing area. During fabrication, glass sheets intended for use as shaped windows in vehicles are subjected to thermal treatment to temper the glass for strengthening the same and increasing the resistance of the shaped window to damage resulting from impact. In addition to increasing the resistance of a glass sheet to breakage, tempering also causes a glass sheet to fracture into relatively small, relatively smoothly surfaced fragments that are less injurious than the relatively large, jagged fragments that result from the more frequent breakage of untempered glass.

The commercial production of shaped glass sheets for such purposes commonly includes heating flat sheets to the softening point of the glass, shaping the heated sheets to a desired curvature and then cooling the bent sheets in a controlled manner to a temperature below the annealing range of the glass. During such treatment, a glass sheet is conveyed along a substantially horizontal path that extends through a tunnel-type furnace where the glass sheet is one of a series of sheets that are heated to the deformation temperature of glass and into a shaping station where each glass sheet in turn is transferred onto a shaping mold that lifts the glass sheet into engagement with a vacuum mold. The vacuum mold holds the shaped glass by suction while the lifting member retracts to below the substantially horizontal path. The shaped glass sheet is then released from the vacuum mold and conveyed into a cooling station as rapidly as possible where the glass sheet is exposed to cold tempering medium applied at a rate sufficient to impart at least a partial temper in the shaped glass sheet.

When prior art apparatus lifted a shaped glass sheet from a horizontal path of travel into engagement with an upper vacuum shaping mold, it used either a ring-type outline mold having spaces aligned with transversely extending conveyor rolls that conveyed glass sheets into a shaping station, which mold lifted the glass sheet above the path of glass sheet travel or used a shaping mold that was notched along its opposite side edge portions only to provide clearance for the mold to move vertically above the level of the path defined by stub rolls.

Hot glass sheets shaped on an outline mold sag uncontrollably within the outline defined by the outline mold. Hot glass sheets conveyed on stub rolls to a shaping station sag uncontrollably in the space separating the laterally inner ends of opposing stub rolls.

2. The Prior Art

U.S. Pat. No. 3,374,077 to James H. Cypher and U.S. Pat. No. 3,374,080 to Robert W. Wheeler disclose continuous molds disposed horizontally for shaping glass sheets and provided with notched portions at their edges only to provide clearance for movement through a path of travel defined by stub rolls. Stub rolls do not control sagging of glass sheets conveyed therealong in the space between the portions supported by stub rolls, except for relatively thick glass sheets that are not required in present day vehicles where fuel efficiency is important. Also, whenever glass sheets of different transverse dimensions from a previous production pattern must be fabricated, it becomes necessary to adjust the length of the stub rolls as well as replace the mold to produce glass sheets conforming to the new production pattern, regardless of whether the new production pattern has the same or different radius of curvature compared to the previous production pattern. Further adjustment is needed to change for production of glass sheets having different outlines, some of which may be rectangular and others non-rectangular.

U.S. Pat. No. 3,418,098 to William Kirkman and U.S. Pat. No. 3,527,589 to George F. Ritter, Jr., disclose a horizontally disposed shaping mold of the outline type that is attached to and vertically spaced above a supporting plate for bending horizontally oriented glass sheets. The molds are interrupted to provide clearance for the mold to move through a plane occupied by a series of spaced conveyor rolls. Outline molds are incapable of controlling the exact shape to be imparted to the glass sheets within the supported outline. Also, outline molds must be replaced with molds of different outline whenever a different pattern of glass sheets is to be fabricated, even when the radius of curvature to be imparted to glass sheets of different outline configuration is the same. Changing molds for each change of pattern consumes time and any means that reduces the number of mold changes is desirable.

U.S. Pat. No. 3,756,797 to Kazuyuki Akeyoshi et al discloses a mold having grooves extending both longitudinally and transversely of an apertured shaping surface of a glass sheet bending mold of the sag bending type that is moved on rollers 24 through a heating furnace. Heated gas is applied through the apertures and exhausted through the grooves. The grooves are much smaller than the usual size of conveyor rolls used to convey glass sheets into a shaping station.

SUMMARY OF THE INVENTION

The present invention provides a glass sheet shaping mold comprising a solid block of refractory material having an upper shaping surface defining a shape having a fairly uniform radius of curvature provided by a plurality of smooth, curved, upwardly facing, spaced, elongated shaping members. The terms "solid block" for the purpose of this invention may comprise either a single block shaped to provide a series of elongated shaping members spaced by parallel grooves or a plurality of blocks abutted together to provide alternate elongated shaping members and grooves extending across the length or width dimension of the mold with a line extending across the other of said length or width dimension alternately crossing shaping members and grooves intermediate therebetween. The mold has dimensions larger than those of a family of windows of a given radius of curvature but different outline shapes. Such molds are capable of shaping glass sheets having different outline patterns to shapes having a given radius of curvature, and need not be replaced until production requirements call for bent windows having a different radius of curvature.

A specific embodiment of this invention comprises a solid block of refractory material that does not appreciably mar a hot glass sheet on contact provided with a series of longitudinally spaced, transversely extending shaping members that extend completely across the entire width of the shaping mold and have upper surfaces shaped to conform to a desired shaping surface. The shaping members are spaced by grooves having sufficient width and depth to permit clearance for raising the mold above a horizontal path of glass sheet travel defined by spaced conveyor rolls or other glass sheet conveyor means. The grooves have a maximum width of two inches (50.8 millimeters) and are formed between adjacent longitudinally spaced shaping members. The shaping mold is preferably constructed of a solid block of an alumino-silica cement with each shaping member forming a portion of a smooth upper shaping surface of cylindrical configuration that does not mar hot glass sheets. The mold is mounted on a metal base fixed to an actuating piston that controls the mold location between a recessed position and a glass sheet engaging position.

While the preferred embodiment of this invention developed for use with transversely extending conveyor rolls has transversely extending shaping members alternating with transversely extending slotted portions, in its broadest aspect the present invention envisions a mold for use with glass sheet delivery means comprising a plurality of elongated glass sheet supporting members that support the glass across its entire dimension that may extend parallel, oblique or transverse to a path of travel for the glass sheet to the shaping station. Such a mold comprises elongated shaping members alternating with slots that extend across the entire dimension of the mold parallel to the orientation of the elongated members of the glass sheet delivery means.

The present invention will be better understood in the light of a description of an illustrative embodiment that follows, which description includes the accompanying drawings wherein like reference numbers refer to like structural elements.

BRIEF DESCRIPTION OF THE DRAWINGS

FIG. 1 is a fragmentary, plan view of apparatus for shaping and tempering glass sheets incorporating a preferred embodiment of the present invention, with certain parts omitted for clarity, showing how a shaping mold built according to the present invention is constructed and arranged with respect to said preferred illustrative embodiment;

FIG. 2 is a fragmentary, longitudinal view of the embodiment of FIG. 1 with certain parts omitted or broken away or shown in inconsistent positions to show other parts of the appartus more clearly and with certain positions depicted in phantom consistent with FIG. 1;

FIG. 3 is a fragmentary, perspective, partly schematic view looking upstream of the apparatus from one side of a sheet transfer means showing a ring-like member returning upstream to the shaping station while the glass sheet moves downstream into a downstream conveyor, with certain parts omitted to show other parts more clearly;

FIG. 6 is a side elevational view of a specific embodiment of the lower shaping mold;

FIG. 7 is a sectional view taken along the line 7—7 of FIG. 6; and

FIG. 8 is a plan view of the shaping mold of FIGS. 6 and 7 taken along the line 8—8 of FIG. 7.

DESCRIPTION OF THE PREFERRED EMBODIMENT

Figure 4:
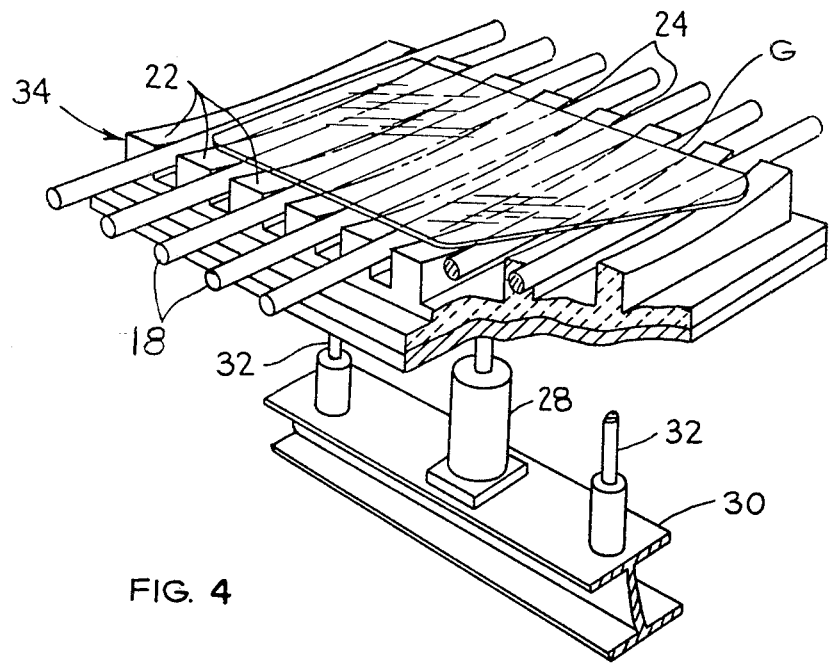
FIG. 4 is a fragmentary perspective view of the lower shaping mold in its retracted position with parts removed to show certain parts in section.

Referring now to FIGS. 1 and 2 of the drawings, an apparatus for treating and shaping sheets of material, such as glass, includes a heating means including a furnace 12 through which sheets of glass are conveyed from a loading station (not shown) while being heated to the glass deformation temperature. A cooling station generally indicated at 14 for cooling the curved sheets of glass and an unloading station (not shown) beyond the cooling station 14 are located in end-to-end relation to the right of the furnace 12. An intermediate or shaping station 16 is disposed between the furnace 12 and the cooling station 14. A sheet transfer means 17 located in the cooling station 14 transfers the shaped and tempered glass sheet to a downstream conveyor 20 for transport to the unloading station.

Heat may be supplied in the furnace 12 by hot gases from gas burners or by electrical radiant heaters or by a combination of both, which heat supply means are well known in the art. The heating means includes a horizontal conveyor comprising longitudinally spaced, transversely extending conveyor rolls 18 that define a path of travel which extends through the furnace 12 and the shaping station 16. The rolls of the conveyor are arranged in sections and their rotational speed controlled by variable speed motors that operate selectively through clutches (not shown) so that the speed of the different conveyor sections may be controlled and synchronized in a manner well known in the art. A glass sensing element S is located beyond the exit of furnace 12 to initiate a cycle of operation of this apparatus.

Limit switches LS-1 through LS-5 are provided to synchronize the operation of various elements of the apparatus according to a pre-determined sequence. The glass sensing element S, the limit switches LS-1 through LS-5 and various timer circuits actuated thereby cooperate to provide synchronizing means for the apparatus of the present specification.

The shaping station 16 comprises a lower shaping mold 34 and an upper vacuum shaping mold 36. The latter is composed of metal covered with a refractory material such as fiber glass 35 as is well known in the art.

Figure 5:
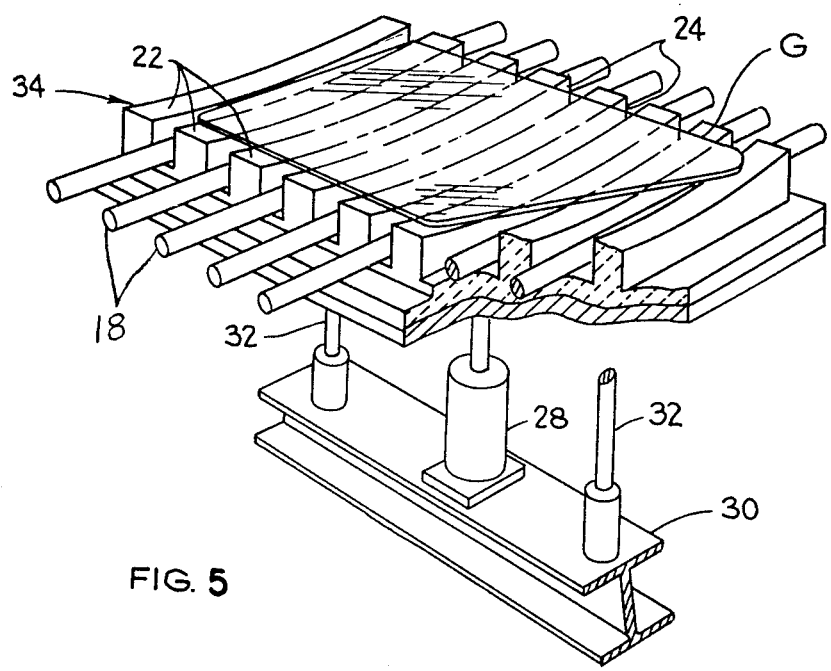
FIG. 5 is a view similar to FIG. 4 showing the lower shaping mold in a position it passes through while raising a glass sheet from conveyor rolls to an elevated position closely adjacent to the upper vacuum shaping mold.

The lower shaping mold 34 is formed from a solid block of refractory material and comprises a plurality of elongated shaping members 22 (FIGS. 3 to 8) whose upper surface conform in elevational shape to the shape desired. The shaping members 22 are separated by transversely extending grooves 24. The depth and width of the latter are sufficient to provide clearance for raising and lowering the lower shaping mold 34 between a recessed position below the conveyor rolls 18, as depicted in FIG. 4, and an upper position above the level of said conveyor rolls, as depicted in FIG. 5. The grooves 24 extend across the entire dimension of the mold. The shaping members 22 may extend entirely across said mold dimension, but may terminate in end ledges 23 (FIGS. 6 and 8) when the upper shaping surfaces of the shaping members 22 define a bend whose depth would approach the thickness of the block. The lower shaping mold 34 is fixed to a lower mold support 26 in the form of an aluminum plate bolted thereto and readily detachable therefrom to substitute a mold 34 for a different production pattern for attachment to the lower mold support 26.

The grooves 24 are provided with floors 25 that extend horizontally across the entire transverse dimension of the lower shaping mold 36 and are spaced sufficiently below the upper shaping surfaces of the shaping members 22, particularly the lowest portion of said upper shaping surfaces, to enable the grooves to encompass the rolls 18 completely when the lower shaping mold 36 is raised to an upward position to engage and lift a glass sheet completely above the plane of support provided by the common upper tangent of the conveyor rolls 18.

Since automobile side windows have a fairly constant radius of curvature about a horizontal axis in order to facilitate their raising and lowering in an automobile body between an open and a closed position, many different patterns in a family of patterns have different outline shapes but are bent to the same radius of curvature. Therefore, it is desirable to have one lower shaping mold capable of producing each family of patterns. It has been found that a lower shaping mold of a given radius of curvature having longer dimensions than a family of side windows of said given radius of curvature but of different outline shapes and/or different dimensions can fabricate curved side windows of said family of different sizes but of said given radius of curvature. In the apparatus of this specification, one lower shaping mold can be installed in conjunction with an upper vacuum shaping mold of complementary curvature to produce any pattern of a family of patterns having a given radius of curvature but of different sizes and/or outline shapes without requiring any removal or replacement of the lower shaping mold until such time as production requirements call for a production pattern from a family of patterns having a different radius of curvature.

The amount of time needed to remove a mold for one pattern and to install a replacement mold for another pattern of the same family having the same radius of curvature but a different outline shape and/or size is considerable and would interfere with time that could be used in production. A lower shaping mold constructed of an outline configuration unique for each production pattern requires replacement of the mold for one having a different outline configuration even when the new production pattern has the same radius of curvature as the previous production pattern. Providing a shaping surface that is universal for all production pattern outlines of a family of patterns having a given radius of curvature according to this invention reduces lost production time.

The shaping members 22 of the lower shaping mold 34 have upper surfaces that are preferably smoothly surfaces to avoid imparting any irregularity in the supported glass sheet surface. The solid block from which the mold is made is composed of a material that does not react with glass, that is easily shaped to the smoothly surfaced contour desired and that has good durability despite intermittent contact with hot glass that causes rapid cyclical temperature variations over an extended period. A good material for the grooved lower shaping mold 34 is an alumino-silica cement sold by Johns-Manville under the trademark of TRANSITE.

Raising and lowering means in the form of a piston 28 rigidly mounted to a piston support platform 30 raises and lowers the mold support 26 and its attached lower shaping mold 34. Alignment posts 32 are attached to the mold support 26 to assure vertical movement of the lower mold 34. A lug 33 is connected to mold 34 to actuate limit switch LS-4.

The grooves 24 have a width and depth sufficient to clear the conveyor rolls 18. The grooves 24 are spaced from one another by a minimum distance along the path of glass sheet travel defined by the conveyor rolls 18 that approximates the width of the grooves.

In a first specific embodiment of this invention, the conveyor rolls 18 in the shaping station 16 are composed of steel rods having a diameter of ¾ inch (19 millimeters) with a center to center spacing of 2 inches (50.8 millimeters). A double thickness sleeve of fiber glass cloth is wound about each conveyor roll 18 in the shaping station 16.

Each groove 24 of the first embodiment as a width of one inch (25.4 millimeters) and is spaced from its adjacent grooves by a distance of one inch (25.4 millimeters) in the direction of glass sheet travel. Thus, the smooth upper shaping surface of the shaping members 22 supports about half of the extent of each glass sheet that it lifts and provides one inch of unsupported span for the heat-softened glass sheet in the first embodiment when it lifts the glass sheet in the shaping station 16.

A second embodiment of this invention uses conveyor rolls 18 composed of steel rods having a diameter of ¾ inch (19 millimeters) covered by sleeves of a material sold as Synthane Grade G-7, a continuous filament fiber glass body impregnated with a silicone resin. The sleeves are slip fit over the steel rods and have a wall thickness of ¼ inch (0.635 cm) to provide an outer composite diameter of about 1¼ inches (3.18 cm) for the conveyor rolls 18 of this embodiment at the shaping station. The conveyor rolls of the second embodiment are spaced on 4 inch (10.16 cm) centers and the shaping members 22 of the second embodiment have a minimum width of 2 inches (5.08 cm) to support at least half the extent of the glass sheet when the latter is engaged. The maximum width of the shaping members 22 is dictated by the need for the intermediate slots 24 to be wide enough to provide clearance for the spaced conveyor rolls of the second embodiment.

Before the lower shaping mold 34 engages the glass sheet, the latter is supported along its entire width by the conveyor rolls 18, which provide transversely extending rolling supports at 2 inch (50.8 millimeter) spacing between the adjacent supports in the first embodiment and at 4 inch (101.6 millimeter) spacing between adjacent supports in the second embodiment. The lower shaping mold of the first embodiment simultaneously lifts a glass sheet on shaping members 22 one inch (25.4 millimeter) wide extending entirely across the width of the glass sheet undergoing shaping at a spacing of one inch (25.4 millimeter) apart, whereas the second embodiment lifts glass sheets on shaping members 22 at least two inches (50.8 millimeter) wide spaced a maximum distance of 2 inches (50.8 millimeter) apart across the entire width of the sheet.

The upper vacuum mold 36 has an upper mounting plate 37 and a lower wall 38 that is apertured, as well as side walls 39, at least one of the latter being apertured. The lower wall 38 is shaped to be complemental to the shaping surface formed by the upper surface 22 of the lower shaping mold 34. The upper vacuum mold 36 communicates with a source of vacuum (not shown) through an evacuation pipe 40 and a suitable valve (not shown). The upper vacuum mold 36 is suitably connected through upper vertical guide rods 41 to an upper supporting frame 42 and movable relative thereto by an upper vertical piston 43. The upper vacuum mold 36 is readily detached from its upper mounting plate 37 to permit rapid substitution of another upper vacuum mold 36 conforming to a different production pattern. The evacuation pipe 40 may be connected through a suitable valve arrangement to a source of pressurized air (not shown) and the valves for the vacuum line and for the pressure line may be synchronized according to a predetermined time cycle in a manner well known in the art.

Any portion of a side wall 39 of the upper vacuum shaping mold 36 that contains apertures is also provided with an apertured slide 60 having a tab 61 at one end thereof. The apertured slide 60 has apertures conforming to similar apertures in apertured wall 39 and is movable along said apertured wall 39 to occupy a position in which its apertures are completely aligned with the apertures in apertured side wall 39 to provide a maximum effective open area for the side wall 39, and to occupy another position in which its apertures face the spaces between the apertures in the apertured side wall 39 so as to enable side wall 39 to behave in the same manner as a continuous side wall with no effective open area. It is understood that the slide 60 may be adjusted in any position in which its apertures are partially aligned with the apertures of the apertured side wall 39 or in which only one or more of its apertures are partially or completely aligned with one or more apertures of the apertured side wall 39 to provide a desired amount of effective open area in the side wall 39 and means for adjusting the amount of open area as needed.

The reason for providing apertures in at least one of the side walls 39 and an apertured slide 60 therefor is to insure that a glass sheet G drops uniformly onto a ring-like member 70 (to be described later) when the latter is located below the upper vacuum shaping mold without tilting from the orientation at which it is engaged against the apertured lower wall 38 of upper vacuum shaping mold 36 when vacuum is released from the latter. The ring-like member 70 supports the glass sheet for movement from the shaping station 16 into the cooling station 14.

The apertures in the apertured lower wall 38 are made as small as possible to minimize distortion of a heat-softened glass sheet supported thereagainst by suction and are spaced as closely as is necessary to assure vacuum support for a hot glass sheet with reasonable energy consumption. For an upper vacuum mold having a glass sheet engaging apertured lower wall 38 with dimensions 46 inches (117 cm) long and 22 inches (56 cm) wide, apertures having a diameter of 0.09 inches (0.23 cm) and spaced apart from one another 1.5 inches (3.8 cm) in a rectangular or diamond pattern have been found to work adequately in handling glass sheets whose weight is up to 20 pounds (9 Kgm.). Five apertures, each having a diameter of one inch (25.4 mm) spaced apart on 2.2 inch (56 mm) centers are sufficient for the apertured slide 60 and the corresponding row of apertures in side wall 39.

The shaping station 16 also includes a lower platform 44. Vertical posts 46 interconnect the corners of the upper mold supporting frame 42, the piston support platform 30 and the lower platform 44 to provide a unitary structure. Wheels 48 are mounted on the unitary structure to permit the shaping station 16 to be readily removed from a position of alignment between the exit of the furnace 12 and the entrance to the cooling station 14 and an offset position to facilitate maintenance of the structural elements of the shaping station 16.

The cooling station 14 comprises an upper plenum 51 provided with longitudinally spaced transverse rows of transversely spaced pipe nozzles 52 extending downward to direct air applied under pressure to the upper plenum toward the upper surface of a glass sheet that is aligned with the bottom openings of the nozzles. Opposing the upper plenum 51 is a lower plenum 53 provided with a lower bar-type nozzle housings 54 disposed with thick walls extending vertically and having elongated openings 55 directed upward through their width dimension so that air applied under pressure to the lower plenum 53 is directed upward through the elongated openings 55 against the lower major surface of the glass sheet. The openings of the lower bar-type nozzle housings oppose corresponding openings in the upper pipe nozzles. The bar-type nozzle housings are spaced vertically below the upper pipe nozzles to provide clearance for moving the ring-like member 70 along a path between said upper nozzles and said lower nozzles. The lower ends of the rows of pipes are located along a curved surface complementary to the curved shape of the upper smooth surfaces of the bar-type housings for the lower nozzles to provide a curved clearance space therebetween conforming to the transverse shape of the glass sheets conveyed therebetween. If desired, the plenums 51 and 52 may be sectionalized along the length of cooling station 14 to provide different air pressures into the various sections of the upper plenum and of the lower plenum so as to provide a program of air blasts along the length of the cooling station 14.

The upper surfaces of the lower bar-type nozzles housings 54 are smoothly surfaced and parallel to one another to provide discontinuous smooth surfaces on which glass cullet is deposited when a glass sheet fractures in the cooling station 14. The lower bar-type nozzle housings 54 are inter-connected by a pivotally mounted frame 50 that pivots about on axis extending longitudinally of the length of the cooling station 14. Frame pivoting means 49 is provided to pivot the frame 50, thereby pivoting the smoothly surfaced lower bar-type nozzle housings 54 into an oblique orientation that permits the glass fragments to slide to one side of the cooling station to clear the cooling station of glass fragments rapidly and efficiently. The lower bar-type nozzle housings 54 are returned to their normal position after the fragments of a prior glass sheet have slid to one side of the cooling station and before the next glass sheet is processed. The means to pivot the lower bar-type nozzle housings 54 is similar in construction to that disclosed and claimed in U.S. Pat. No. 3,846,106 to Samuel L. Seymour for pivoting a lower set of nozzles, and the description of said pivoting apparatus is incorporated in the present specification by reference.

The spaces between the upper pipe nozzles 52 provide paths for the escape of air blasted against the upper concave surface of glass sheets treated by the apparatus described in this specification. The spaces between adjacent lower bar-type nozzle housings 54 provide paths for the escape of air blasted against the lower convex surface of said glass sheets. While more total space is provided for the escape paths above the glass than for the escape paths below the glass, the difference in total space for escape provided on opposite sides of the shaped glass sheets is helpful in providing greater uniformity of cooling of the top and bottom surfaces than would be the case if both upper and lower glass sheet surfaces had escape paths of equal size. This result follows because a convex surface is more streamlined than a concave surface. Therefore, it is more difficult to remove air applied normally against a concave surface than air applied normally against a convex surface and therefore more escape space is provided to remove air blasts that impinge against the upper concave surface than for air blasts that impinge against the lower convex surface.

The sheet transfer means 17 at the cooling station 14 includes a vertically movable conveyor section comprising a set of doughnut rolls 56 of relatively large diameter mounted on the central portions of thin shafts 58 driven from a gear box and a motor (not shown) mounted on a frame 64. A lug 65 connected to frame 64 actuates limit switch LS-5. Elevator means 66 in the form of one or more pistons is rigidly supported (each with a piston rod 68) on said frame. Vertical guides 69 control movement of the frame 64 in such a manner that when piston rods 68 are extended, the set of doughnut rolls 56 is lifted in unison in a vertical direction into positions where their common upper tangential plane lies in a horizontal plane above the uppermost portion of the shaping surface of the ring-like member 70 to transfer a glass sheet therefrom.

The cooling station 14 also comprises a downstream conveyor 20 comprising additional conveyor shafts 72 downstream of the sheet transfer means 17. Each additional conveyor shaft 72 is provided with a pair of additional doughnut rolls 74 fixed thereto for rotation therewith. The shafts 72 are longitudinally spaced at equal distances from one another along the length of the downstream conveyor 20 and the additional doughnut rolls 74 are rigidly supported with their common upper tangent occupying a horizontal plane slightly above the uppermost surface of ring-like member 70.

The ring-like member 70 comprises a rail that extends in the form of a ring-like structure disposed edgewise with its width forming the height of the rail. The rail comprises a transverse portion 76 shaped in elevation, a pair of longitudinal rail portions 77 and upstream end portions 78. Connectors 79 are attached at their inner ends to the laterally outer surface of the rail at spaced points therealong and at their outer ends to a reinforcing frame 80. Both the latter and the frame-like member 70 are spaced in outline similar to the outline shape of a supported glass sheet and in elevation similar to the curvature of the supported glass sheet.

The reinforcing frame 80 is preferably constructed of an outer steel pipe similar in outline shape to that of the ring-like member 70 and surrounds the latter in spaced relation thereto. The space between the ring-like member 70 and the reinforcing frame 80 is determined by the length of the connector means 79. Both the ring-like member 70 and the reinforcing frame 80 have open portions at their downstream ends. The reinforcing frame 80 is connected to a carriage 96 through connecting members 97. The carriage 96 is provided with upstanding ears 98 that terminate in internally threaded sleeves 100 that engage a worm drive 102 on each side of the carriage 96. This arrangement guides the movement of the ring-like member 70 between an upstream position at shaping station 16, a downstream position in alignment with sheet transfer means 17 and an intermediate parking position just downstream of the shaping station. The carriage 96 is reinforced by several arcuate cross braces (not shown) shaped to conform with the transversely curved shape defined by the upper surfaces of the lower bar-type nozzle members 54 and the lower ends of the rows of upper pipe nozzles 52 so as to be capable of moving therebetween.

The doughnut rolls 56 of the shaped glass sheet transfer means 17 are arranged in spaced, parallel rows. At their upper positions, the vertically movable rolls 56 have an upper common tangent in the same horizontal plane as the upper common tangent of the additional doughnut rolls 74. At their lower positions, rolls 56 are located below the path taken by ring-like member 70 and its supporting frame 80.

The worm drive 102 controls the position of the carriage 96 and its supported ring-like member 70 relative to one of the three positions of rest occupied by the ring-like member 70 during a cycle of operation. Limit switches LS-1, LS-2, and LS-3 are provided for acuation by a lug 104 attached to the carriage 96 to control different steps in a cycle of movement of the ring-like member 70 to be explained subsequently.

Cycle of Operation

When a glass sheet G has arrived at a position in the shaping station 16 in spaced alignment between the lower shaping mold 34 and the upper vacuum mold 36, the ring-like member 70 is returning in an upstream direction toward its parking position immediately downstream of the shaping station 16.

The glass sheet G is then engaged and lifted by the lower mold 34 into the vicinity of the upper vacuum mold 36, sensing means S having actuated a timer that stops the glass sheet G in a proper position at the shaping station 16 a predetermined time interval after having sensed the presence of a glass sheet passing through the exit of the furnace 12. Vacuum is supplied to the vacuum chamber of upper vacuum mold 36 to transfer the glass sheet from gravity support on the lower shaping mold 34 to vacuum support against the upper vacuum mold 36 and to hold the shaped glass sheet G against the apertured lower wall 38 of the upper vacuum mold 36 so that the glass sheet will remain in contact with said apertured lower wall 38 when lower shaping mold 34 is retracted. The lower shaping mold 34 has been lifted in response to the sensor S actuating a timer circuit (not shown) that extends the piston 28 on sensing the passage of a glass sheet G into the shaping station 16. Limit switch LS-4 is released by the lifting of mold 34 to actuate the vacuum for upper vacuum mold 36 and to actuate a timer that controls the onset of the return of the lower shaping mold 34 to its recessed position. Positive stops may be used to control the lowest position of the upper vacuum mold 36 and the highest position of the lower shaping mold 34.

Lower shaping mold 34 then retracts, thereby resetting limit switch LS-4, and also retracting the upper vacuum mold 36 with suction still applied to hold the glass sheet thereagainst. The shaping section is now ready to receive the ring-like member 70 into position beneath the upper vacuum mold. When lug 104 engages limit switch LS-1, the ring-like member 70 is stopped at its aforesaid upstream position.

At the same time, limit switch LS-1 releases the vacuum in upper vacuum mold 36, thereby permitting glass sheet G to be deposited onto ring-like member 70 when the latter occupies its upstream position.

The glass sheet G supported on the ring-like member 70 is transferred to the cooling station 14 and rapidly transferred from the ring-like member 70 to the downstream conveyor 20. In order to accomplish this end, the doughnut rolls 56 are raised in unison to lift the glass sheet G off the ring-like member 70 while rotating in unison in a direction that propels the glass sheet in a downstream direction.

FIG. 3 shows the cooled glass sheet G transferring from the doughnut rolls 56 of the sheet transfer means 17 in a downstream direction depicted by the arrow d to the doughnut rolls 74 of the downstream conveyor 20 while the ring-like member 70 is simultaneously beginning to return in an upstream direction depicted by the arrow u toward the parking position immediately downstream of the shaping station 16 in case a succeeding glass sheet G has not as yet been engaged by suction by the upper vacuum shaping mold 36. The ring-like member 70 moves directly into the upstream position at the shaping station 16 should the succeeding glass sheet be already supported by suction against the upper vacuum mold 36 and the lower shaping mold 34 has moved down to a vertical position sufficiently low to provide clearance for the ring-like member 70 to move to below mold 36 without stopping.

The glass sheet G supported on the ring-like member 70 moves downstream between the upper pipe-type nozzles 52 aligned in transverse rows having convexly curved downward ends and the lower apertured, bar-type nozzle housings 54 having complementary, concavely curved upper surfaces and air is blasted through the nozzles 52 and housings 54. The doughnut rolls 56 and their thin shafts 58 at the sheet transfer means 17 remain in the downward retracted position with frame 64 being retracted downwardly by the retraction of the piston rods 68 actuated by elevator means 66 while awaiting the arrival of the ring-like member 70 into position wherein lug 104 engages limit switch LS-2.

By the time the worm drive 102 has driven carriage 96 and its supported ring-like member 70 part-way into the sheet transfer means 17, a timer circuit actuated by lug 104 engaging limit switch LS-2 in the downstream direction has caused the elevator means 66 to raise the pistons 68, thereby lifting frame 64, shafts 58 and rotating doughnut rolls 56 into intermediate positions approaching the level at which they lift the glass sheet G off the ring-like member 70. This upward movement releases limit switch LS-5, thereby causing doughnut rolls 56 to start to rotate.

When the ring-like member 70 has arrived at its downstream position where lug 104 has engaged limit switch LS-3 to stop the worm drive 102, the rotating doughnut rolls 56 have begun to transfer the glass sheet G over the ring-like member 70 and its open-ended reinforcing frame 80 toward the most upstream doughnut roll 74 of the downstream conveyor 20. The piston rod 68 remains fully extended as the glass sheet G continues to move downstream further into the downstream conveyor 20.

Before the trailing edge of the glass sheet G has cleared the open downstream end of the ring-like member 70, the worm drive 102 has begun to move the ring-like member upstream toward the shaping station 16. A timer actuated by limit switch LS-3 controls the onset of the reverse rotation of the worm drive 102 that controls the return movement of the ring-like member 70 in an upstream direction.

When the rolls 56 have transferred the glass sheet G to the doughnut rollers 74 fixed to additional conveyor shafts 72 of the downstream conveyor 20, another timer circit controlled by limit switch LS-3 causes the elevator means 66 to start to retract the piston rods 68, thereby lowering the doughnut rolls 56 and their thin shafts 58. Previously, the lowering of lifting frame 64 to its recessed position actuated limit switch LS-5, which caused the worm drive to move the carriage 96 in an upstream direction into a position where lug 104 engaged limit switch LS-1, thereby permitting ring-like member 70 to be in its intermediate parking position to await the completion of the shaping of a succeeding glass sheet which is indicated by the resetting of limit switch LS-4 when lower shaping mold 34 retracts. However, if the apparatus operates rapidly enough, as indicated by the time-out of a timer circuit whose time starts by a subsequent actuation of sensing means S, the reset limit switch LS-4 permits the ring-like member 70 to move upstream through the intermediate parking position without stopping.

During the time that the ring-like member moves into or through the intermediate parking position controlled by the engagement of lug 104 against limit switch LS-2, lower shaping mold 34 remains retracted sufficiently to provide clearance for the succeeding glass sheet G to enter into a position of alignment between the upper vacuum mold and the lower shaping mold 34.

It is preferred that the thin shafts 58 on which the doughnut rolls 56 are mounted be rotating when the set of rolls 56 is lifted into position above that occupied by the lower surface of the glass sheet G resting on the ring-like member 70. The rolls 56 may rotate continuously or intermittently. In the latter case, it is imperative that the rolls 56 rotate during the portion of their cycle of vertical movement when they engage the lower surface of a glass sheet being transferred.

In order to avoid marking the glass during its transfer from the set of doughnut rolls 56 to the rotating additional doughnut rollers 74 fixed for rotation to the additional conveyor shafts 72, the peripheral speed of the vertically movable rolls 56 located at the sheet transfer means 17 is equal to the peripheral speed of the doughnut rolls 74 of the downstream conveyor 20. In addition, the glass sheet G is cooled rapidly enough while resting on the ring-like member 70 to at least harden its surfaces sufficiently to enable the latter to withstand rolling contact with said rotating rolls 56 without developing substantial surface defects that would cause the resulting glass articles to be rejected by a customer. Preferably, the cooling is performed at a rate sufficient to impart at least a partial temper to the glass sheet before lifting the latter onto said rotating rolls.

Glass sheets of non-rectangular outline transported along a long roller conveyor extending through a furnace tend to become misaligned and misoriented. However, the orientation and alignment of glass sheets may be readily corrected by using the method and apparatus for orienting and aligning glass sheets adjacent to the downstream exit of the furnace described and claimed in U.S. Pat. No. 4,058,200 to Robert G. Frank.

The present invention permits each glass sheet in a series of sheets that is conveyed on a relatively inexpensive roller-type conveyor comprising spaced conveyor rolls that support each glass sheet across its entire width while it is heated to its deformation temperature, to be shaped to the desired configuration at the shaping station 16 using a glass sheet shaping mold comprising a solid block of refractory material comprising spaced shaping members that lift and supports a heat-softened glass sheet entirely across its width at longitudinally spaced areas by engaging a substantial portion of the glass sheet on a smoothly surfaced, upwardly facing, shaping surface of a shaping mold, thereby insuring adequate support over the extent of the glass sheet. Such support with a maximum width of approximately two inches (50.8 millimeters) of grooves providing unsupported spans therebetween results in shaping the treated glass sheets to a shape conforming to that of the slotted upper shaping surface of the shaping mold. The grooves separating the shaping members have a minimum width and depth sufficient to clear the glass conveying rolls 18 or any other means that may be used to deliver one or more glass sheets of a series of sheets to a shaping station.

The slotted mold of this invention may also be used with delivery means that may comprise a series of fingers that support a glass sheet completely across a dimension of the sheet that may extend parallel to or at any desired angle relative to a path of travel taken by each glass sheet into the shaping station. The grooves in the grooved mold are aligned with the length of the fingers so that the fingers may be lowered to transfer the glass sheet onto the slotted mold of this invention. The fingers may then be removed from the grooves in a path that includes an initial motion parallel to the groove length. The vacuum mold and outline ring-like member may be used or replaced by a series of fingers that enter the slots as the delivery fingers retract or above the delivery fingers as the latter retract from the slots and then by relative vertical motion engages the glass sheet across its entire dimension to support the shaped sheet into the cooling station.

In the claims that follow this specification, the term shaping mold is used to refer to the lower shaping mold 34 provided with a smoothly curved shaping surface having grooves extending completely across the entire transverse dimension of the mold. A flat glass sheet is conveyed on transversely extending rotating conveyor rolls that provide longitudinally spaced, transversely continuous lines of support for each glass sheet in the series until the sheet is lifted by the closely spaced, transversely extending continuous areas of curved support at the shaping station 14. Thus, the apparatus of the present invention positively supports each heated glass sheet in turn over a substantial portion of its surface area with narrow areas of non-support therebetween as the lower mold lifts the glass sheet upward the complementary shaping surface of the upper vacuum mold. The heat-softened glass sheet sags to conform to the shape of the upwardly facing shaping surface 22 with very little space between the supporting areas for the shaped glass sheet to develop regions of uncontrolled sag. While the latter is not eliminated entirely, precision of glass sheet shaping is improved by virtue of the engagement of the shaped glass sheet by suction against the upper vacuum mold. However, even in the absence of an upper vacuum mold, the shape imparted to a heat-softened glass sheet conveyed into a shaping station on longitudinally spaced, continuous conveyor means for engagement by a shaping mold having continuous, shaped areas of support between grooves having a width and depth sufficient to provide clearance for the continuous conveyor means conforms more closely to the desired shape than the shape obtained by conveying heat-softened glass sheets into a shaping station having an outline shaping mold or by conveying heat-softened glass sheets into a shaping station on stub rolls for engagement and lifting by a shaping mold having notches in its marginal portions that provide clearance for the shaping mold to move past the path of glass sheet travel defined by the stub rolls.

The form of the invention shown and described in this disclosure represents an illustrative preferred embodiment thereof. It is understood that various changes may be made in the structure and method of operation without departing from the gist of the invention except insofar as defined in the claimed subject matter that follows.

We claim:

1. An apparatus for shaping glass sheets, comprising:
    a shaping station having a plurality of elongated glass sheet conveying members;
    a shaping mold comprising:
        a solid block of refractory material having an upward facing shaping surface defining a shaping area having dimensions larger than those of said sheet, said shaping surface having a plurality of smooth, continuous, curved, upward facing, spaced elongated shaping members defining a common curve having a given maximum depth of curvature; and
        a continuous elongated grooved portion between adjacent shaping members and generally aligned with said elongated conveying members, the depth of the grooved portion being greater than the given maximum depth of curvature of the shaping members; and
    means for moving said mold upward toward said conveying members to move said shaping members between adjacent conveying members.

2. The apparatus as set forth in claim 1 wherein each of said grooved portions comprises a floor occupying a common plane sufficiently below the deepest portion of said upward facing shaping surface for receiving said glass sheet conveying members when said mold is moved upward by said moving means.

3. The apparatus as set forth in claim 1 or claim 2 wherein said moving means further includes means for moving said mold away from said conveying members.

4. The apparatus as in set forth claim 3 wherein the common plane is a substantially horizontal plane.

5. The apparatus as set forth in claim 1 wherein said elongated shaping members define a shaping surface of a cylindrical configuration.

6. The apparatus as set forth in claim 1 or 5 wherein said elongated shaping members define a shaping surface of concave elevation.

* * * * *